United States Patent [19]

Imase

[11] Patent Number: 5,197,930

[45] Date of Patent: Mar. 30, 1993

[54] GEARLESS DIFFERENTIAL SPEED REDUCER DEVICE

[76] Inventor: Kenji Imase, No. 1166 Hujioka-cho, Mitsukuri, Nishikamo-gun, Japan

[21] Appl. No.: 692,591

[22] Filed: Apr. 29, 1991

[30] Foreign Application Priority Data

Dec. 27, 1990 [JP] Japan ................. 2-418853

[51] Int. Cl.[5] ................. F16H 1/28; F16H 13/06
[52] U.S. Cl. ................................................. 475/168
[58] Field of Search ................. 475/168, 196; 74/650, 74/211

[56] References Cited

U.S. PATENT DOCUMENTS

| 4,542,664 | 9/1985 | Sladek et al. | 475/168 |
| 4,643,047 | 2/1987 | Distin et al. | 475/168 |
| 4,829,851 | 5/1989 | Imase | 475/168 |

FOREIGN PATENT DOCUMENTS

| 207206 | 1/1987 | European Pat. Off. | 475/168 |
| 61-140653 | 12/1984 | Japan | 475/168 |
| 60-91043 | 5/1985 | Japan | 475/168 |
| 60-168938 | 9/1985 | Japan | 475/168 |
| 61-119869 | 6/1986 | Japan | 475/168 |
| 62-2064 | 1/1987 | Japan | 475/168 |
| 63-167167 | 7/1988 | Japan | 475/168 |
| 1404708 | 6/1988 | U.S.S.R. | 475/168 |
| 8401607 | 4/1984 | World Int. Prop. O. | 475/168 |

*Primary Examiner*—Leslie A. Braun
*Assistant Examiner*—Ryan W. Massey
*Attorney, Agent, or Firm*—Cooper & Dunham

[57] ABSTRACT

In a gearless differential speed reducer, first and second discs are provided in a manner to oppose each other, and a plurality of semi-spherical recesses circumferentially are provided on the opposing surface of the first disc along a certain pitch circle. A groove provided on the opposing surface of the second disc, the groove defined as a cycloidal-based curve running along a pitch circle. A rollable ball is provided to be placed at each of the semi-spherical recess and the groove. The balls are adapted to roll within the recess, and at the same time, roll along the groove when a rotational movement is transmitted to the second disc to impart the second disc with a nutational movement. A rectifier member provided to pick up a rotational movement from the nutational movement of the second disc.

12 Claims, 10 Drawing Sheets

GEARLESS DIFFERENTIAL SPEED REDUCER DEVICE

BACKGROUND OF THE INVENTION

A. Field of the Invention

The invention relates to a differential speed reducer device and particularly concerns a differential speed reducer device which is capable of ensuring a high reduction ratio without sacrificing compactness so as to respond to industrial needs.

B. Description of the Prior Art

In modern robot technology incorporated into various kinds of machine tools, a speed reducer has been associated with an electric motor to reduce its speed for application to a transfer arm. Examples of presently known speed reducers are worm wheel reducers, cyclo reducers, and harmonic drive reducers.

However, it would be desirable to have a speed reducer improved in the following respectsL (i) high reduction ratio with compact structure, (ii) high precision control with least idle play such as backlash action, (iii) elevated rigidity with high meshing rate, (iv) improved controllability with a relatively small inertia force at rotary members, and (v) minimum loss of torque with minimum wear.

A reducer device which provides these advantages (v) is shown in U.S. Pat. No. 4,829,851. In this patent, first and second discs are provided. Each surface has a groove defined by a cycloidal-based curve. A plurality of balls roll along each groove of the first and second discs when a rotational movement is transmitted to the second disc so as to impart the second disc with a nutational movement. A rectifier disc picks up a rotational movement from the nutational movement of the second disc to produce a reduced output.

It is, however, often desired to ensure a greater reduction ratio (up to 1/50~1/100) in a reducer device particularly employed to machine tools. From the point of strength and machinability, it is thought to be difficult for the prior reducer to ensure such a great reduction ratio without sacrificing its compactness.

Therefore, it is an object of the invention to provide a differential speed reducer device which enables high precision control with minimum backlash play, high rigidity with high meshing rate, improved controllability with small inertia force, and a greater reduction ratio with a compact structure.

SUMMARY OF THE INVENTION

According to the present invention, there is provided a gearless speed reducer device comprising: first and second discs located to oppose each other through their opposing surfaces; a plurality of semi-spherical recesses circumferentially provided on the opposing surface of one of the first and second discs along a certain pitch circle; a groove provided on the opposing surface of the other of the discs, the groove defined as a cycloidal-based curve running along a pitch circle, a radius of which is the same as that of the semi-spherical recesses; a rollable ball, one semi-spherical portion of which is generally placed at the recess while other semi-spherical portion of the ball placed at the groove, the ball rolling within the recess, and at the same time, rolling along the groove when rotational movement is transmitted to the second disc to impart the second disc with nutational movement; and a rectifier member provided to pick up a rotational movement from the nutational movement of the second disc.

When a rotational movement is transmitted to the second disc, each of the balls roll within the semi-spherical recess and along the groove to impart the second disc with a nutational movement. The rotational movement is transferred to the nutational movement of the second disc so as to produce it as a reduced output.

When the groove is provided with the first disc while the semi-spherical recesses provided with the second disc, the output is reduced by a single lobe. When the groove is provided with the second disc while the semi-spherical recesses provided with the first disc, the output is reduced by a single pitch between the neighboring two balls.

That is, the reduction ratio is calculated by an inverse number of the balls, otherwise by the number of lobes of the groove. This makes it possible to ensure a greater reduction ratio without sacrificing a compact structure.

When the second disc usually carries a high load, the ball rolls within the recess by surface-to-surface contact so as to enhance its carrying ability with minimum loss of torque transmission.

With the enhancement of the carrying ability, it becomes unnecessary to make the second disc from a hard material, thus reducing cost of material and machining time required to provide high machining precision.

It is possible to machine the recesses rapidly with a simple operation in contrast to the case in which it is required to machine the cycloidal-based groove on each of the discs.

BRIEF DESCRIPTION OF THE DRAWINGS

In order that the invention may be more clearly understood, the following description is given by way of example only, with reference to the accompanying drawings in which.

DESCRIPTION OF THE PREFERRED EMBODIMENTS

Figure 1:
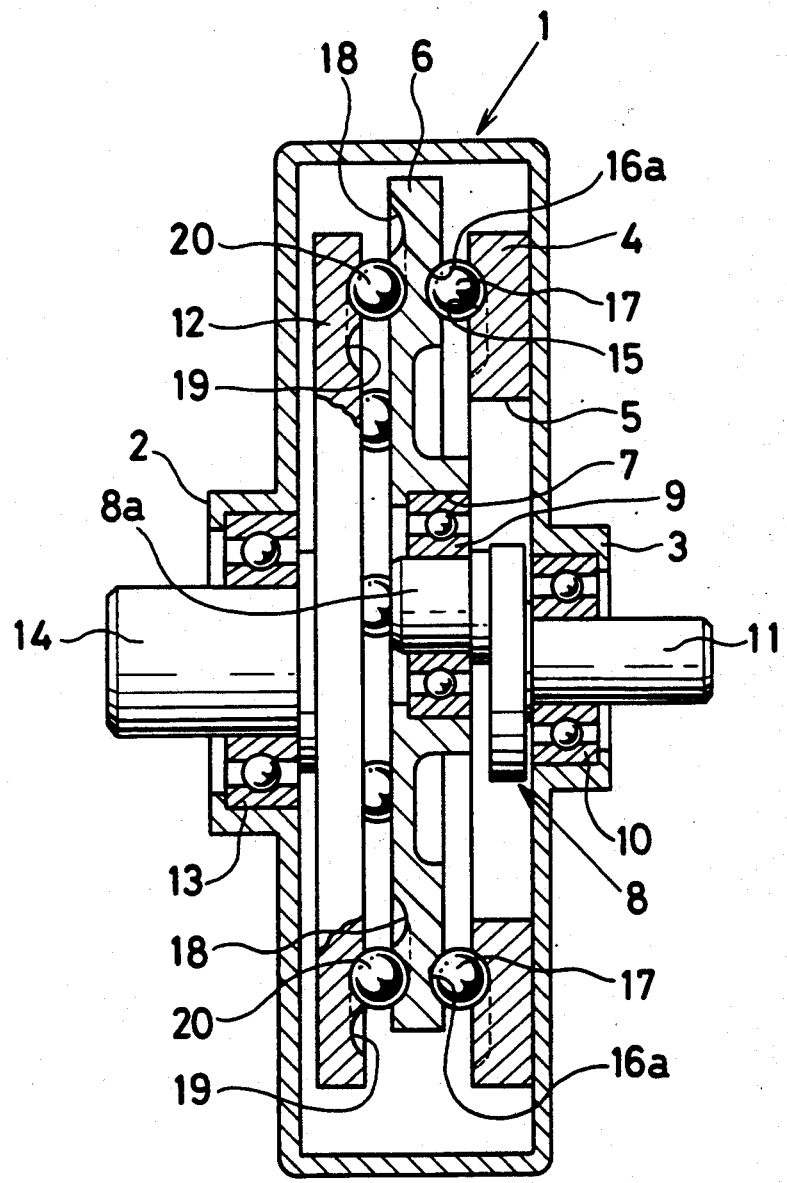
FIG. 1 is a longitudinal cross-sectional view of a speed reducer device according to a first embodiment of the invention.

Referring first to FIG. 1, numeral 1 designates a box-shaped casing according to a first embodiment of the gearless differential speed reducer of the present invention. Support flanges 2, 3 are provided on horizontally opposed walls of the casing 1. A first annular disc 4, which is made of a steel, is disposed in the casing 1, and rigidly secured to the right wall of the casing 1 as shown so as to communicate its central aperture 5 with the flange 3. A second circular disc 6 has a central boss 7, and is disposed in the casing 1 to face the disc 4. The second disc 6 is also made of the same metallic steel as the first disc 4. An eccentric shaft 8 is placed in the casing 1 in the aperture 5 of the disc 4. The shaft 8 is mounted at one end 8a on the boss 7 of the second disc 6 through a bearing 9, and at the other end on the flange 3 through a bearing 10 to act as an input portion 11. In this instance, the first shaft 8 directs its eccentricity to correspond to that of a sinuous groove described in detail hereinafter. A rectifier disc 12 is placed in the casing 1 to face the circular disc 6, and has a central output shaft 14 mounted on the flange 2 through a bearing 13.

Figure 2:
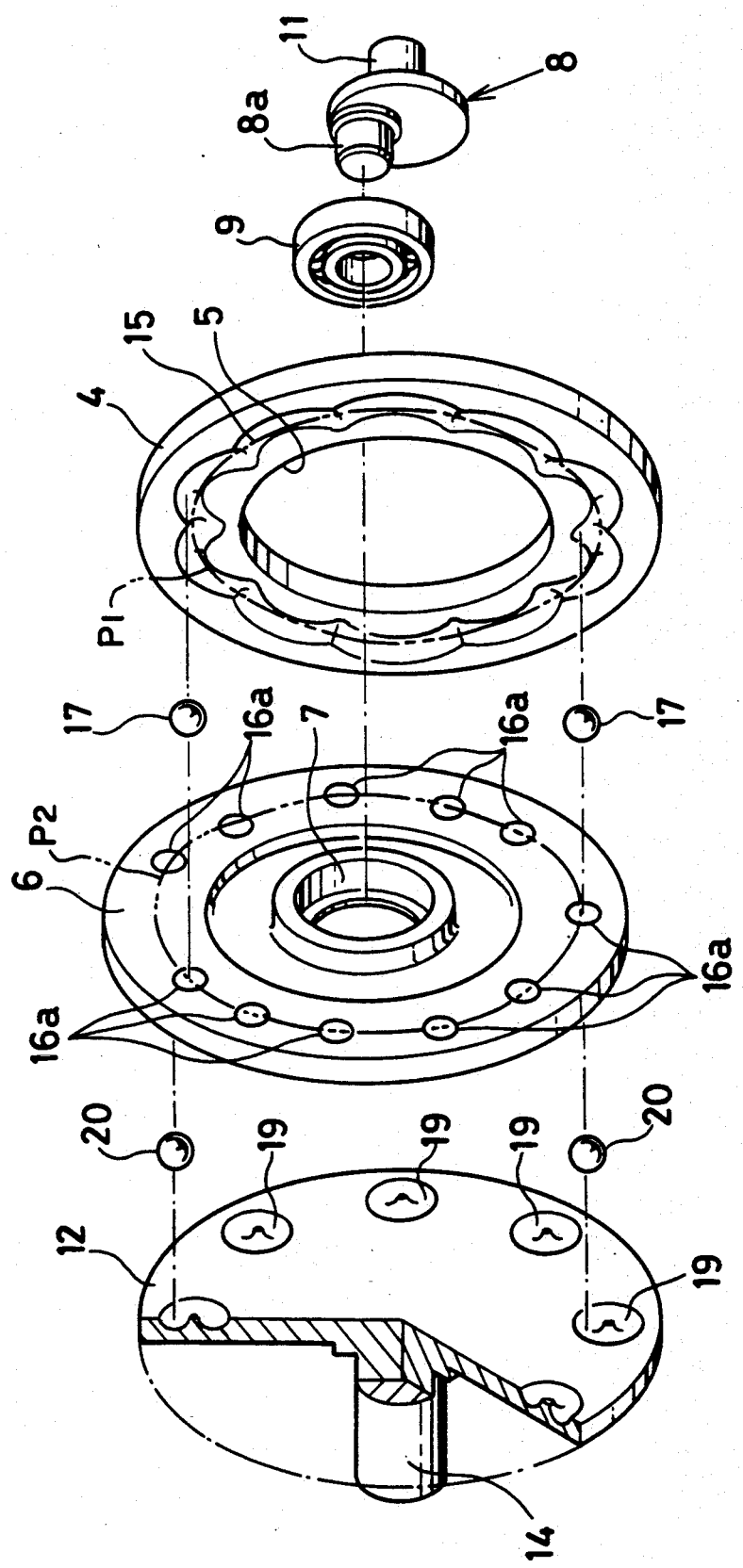
FIG. 2 is an exploded perspective view of the speed reducer device of FIG. 1.
Figure 3A:
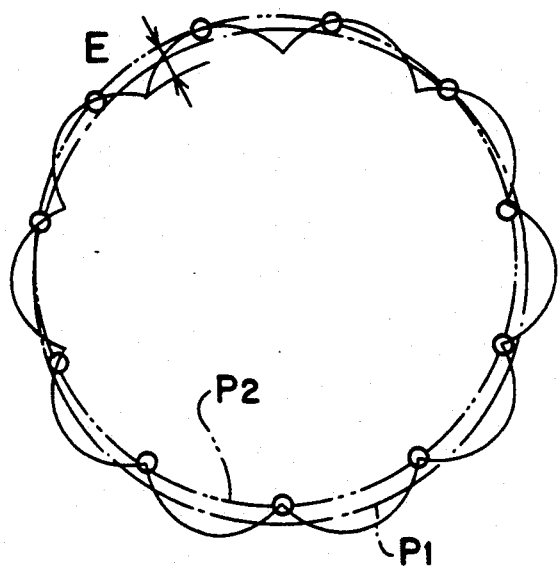
FIGS. 3a and 3b are explanatory views showing a positional relationship among a groove, semi-spherical recesses and rollable balls.

Now, on the surface of the disc 4, is a sinuous groove 15 semi-circular in section provided as seen in FIG. 2. The sinuous groove 15 thus provided is defined by an epicycloidal curve continuously formed in the first disc 4 along a predetermined pitch circle (P1) as shown in FIG. 3a, and having ten lobes with half the wavelength as a single lobe. The groove 15 has both inner and outer walls, and has an upper open width somewhat smaller than a spherical diameter of a rollable ball 17 described in detail hereinafter. The semi-circular section of the groove 15 has a radius of curvature substantially identical to that of the ball 17. In this instance, the groove may be defined by a hypocycloidal curve continuously formed in the disc along a pitch circle identical to that mentioned above but provided with twelve lobes by way of illustration.

Figure 3B:
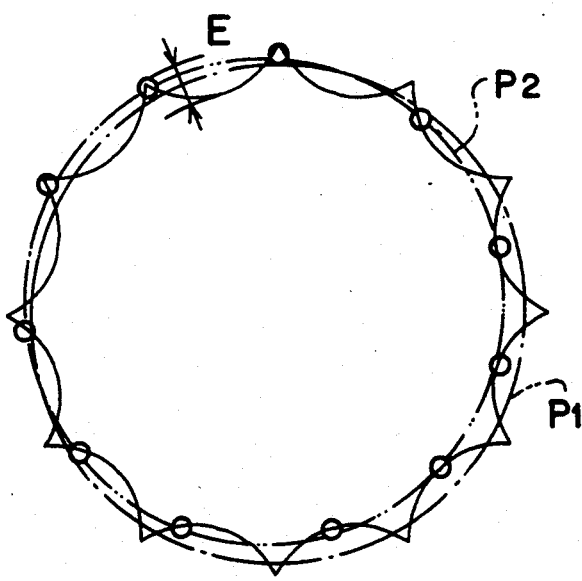

Regarding the epicycloidal and hypocycloidal curves, they are each obtained by rolling one circle along another circle in circumscribing and inscribing relationship therewith, as shown in FIGS. 3a, 3b in which the height of the lobe is designated as (E), the amount of which acts as an eccentricity.

Figure 3C:
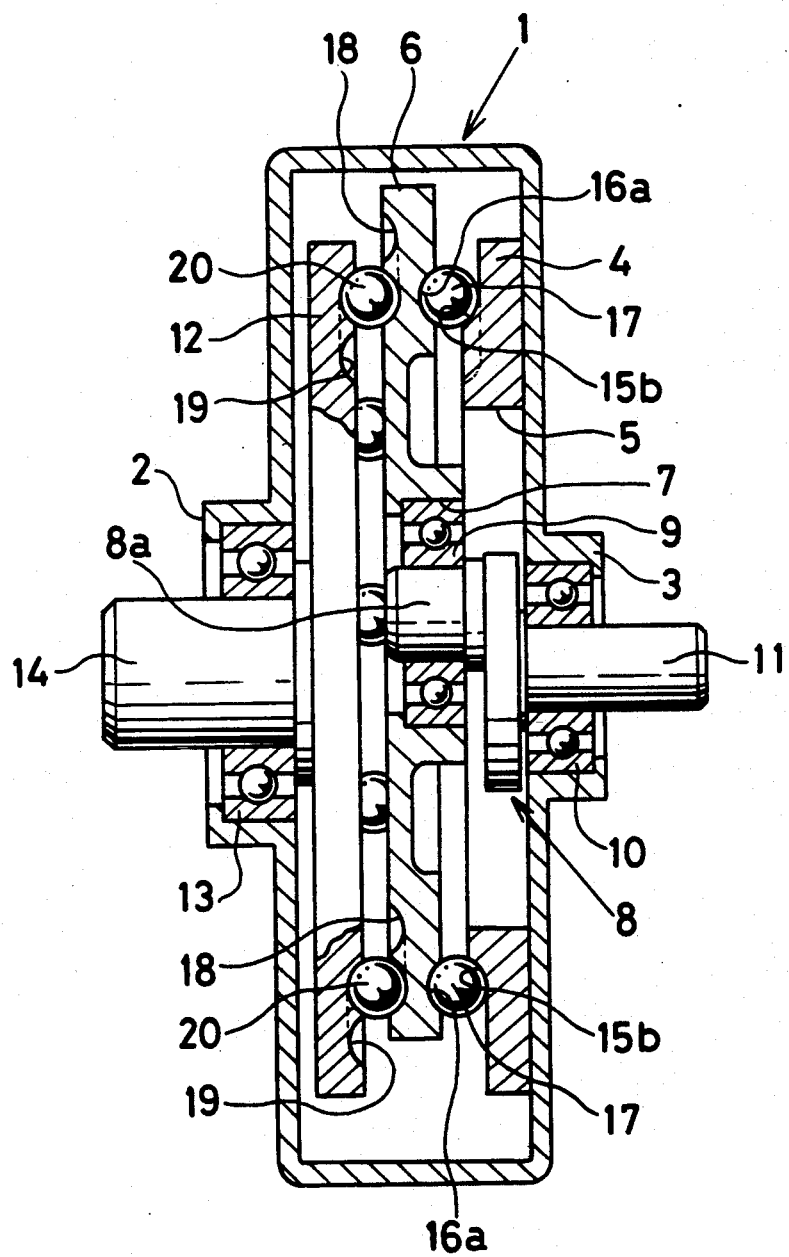
FIG. 3c is a longitudinal cross-sectional view of a speed reducer device to show a modified form of a groove.

As for the cross sectional shape of the groove 15, the section may be V-shaped arch so that the ball 17 rolls along the groove 15 by two-point contact. The groove may also have only the inner wall serve as an inner race as indicated at 15b in FIG. 3c.

The second disc 6 has an opposing surface facing the first disc 4 so as to form a plurality of, e.g. eleven semi-spherical recesses 16a on the opposing surface along a pitch circle (P2), a radius of which is the same as that of the groove 15. The semi-spherical recesses 16a are positioned at regular intervals, and have a depth somewhat smaller than a spherical diameter of the rollable ball 17, but having a radius of curvature substantially identical to that of the ball 17. In this instance, in order to impart a friction-resistant property with the groove 15 and the recesses 16a, the first and second discs 4, 6 may be case hardened for example, by quenching, nitriding or carburizing.

Between the first and second discs 4 and 6 are spherical balls 17 which are made from, for example, a metallic steel, and positioned in both the groove 15 and recesses 16a. The number of the balls 17 corresponds to that of the recesses 16a. Each of the balls 17 is adapted to roll within the corresponding recess 16a, and rolls along the groove 15 in combination with rotational movement of the disc 4.

These balls 17 are located at intersections in which the pitch circle (P2) of the recesses 16a meets the epicycloidal curve of the groove 15, as shown at dots in FIG. 3a. When the groove 15 is defined by the hypocycloidal curve, the balls 17 are located at intersections in which the pitch circle (P2) of the recesses 16a meets the hypocycloidal curve of the groove as shown at dots in FIG. 3b.

On the opposing surfaces of the second disc 6 and the rectifier disc 12, are identical groups of annular grooves 18, 19 provided, whose diameters correspond to the eccentricity between the pitch circle (P1) of the groove 15 and that of the recesses 16a. Between the second disc 6 and the rectifier disc 12, are rigid steel balls 20 positioned in the annular grooves 18, 19 so as to roll along the grooves 18, 19 in combination with the movement of the second disc 6.

With the structure incorporated, for instance, into a transfer robot, the eccentric shaft 8 is drivingly connected to an electric motor through the input shaft 11 while the rectifier disc 12 connects its output shaft 14 to a transfer arm (not shown).

The motor, once energized, allows the shaft 8 to rotate in one direction so as to transmit its rotation to the second disc 6 through the end portion 8a. The second disc 6, thus subjected to the rotation about the axis of the shaft 11, also rotates around the end portion 8a due to the oscillating relationship between the groove 15 and the recesses 16a interconnected as they are by the balls 17. During this process, each of the balls 17 rolls within the corresponding recess 16a, and at the same time, rolling along the groove 15 so as to impart the second disc 6 with a nutational movement.

The disc 6 thus moved, on the other hand, causes the balls 20 to roll around the annular grooves 18, 19 and transmits only a rotational force to the rectifier disc 12 in the direction identical to that of the eccentric shaft 8, cancelling the component of the eccentric movement of the disc 6. This permits the shaft 14 of the rectifier disc 12 to rotate so as to activate a transfer arm for carrying such as, for example, an assembly part from one station to another.

In this instance, the reduction ratio is determined by the number of balls 17 placed in the recesses 16a, and calculated by an inverse number of the balls 17 when the groove 15 appears on the first disc 4 while the recesses 16a provided on the second disc 6. According to the preferred embodiment of the invention, eleven balls 17 yields a reduction ratio of 1/11. Similarly ten balls leads to a reduction ratio of 1/10 while fifteen balls leads to a reduction ratio of 1/15. Theoretically a reduction ratio of 1/100 requires one hundred balls. The balls, however, may be positioned every other ball, every four balls or every twenty balls so as to calculate the required number of balls as 50, 25 or 5 in turn.

The required number of lobes of the groove 15 depends on the number of balls positioned in the recesses 16a. It may be calculated by subtracting one from the number of the balls (inverse number of the reduction ratio) when the groove 15 is defined by the epicycloidal curve.

The number of the lobes of the groove 15 is decided by calculating (11−1=10) since the number of the balls 17 is eleven. Similarly a reduction ratio of 1/10 requires nine lobes (10−1=9) while a reduction ratio of 1/15 requires fourteen lobes (15−1=14). When the desired reduction ratio is 1/100, the required number of lobes is ninety-nine (100−1=99).

In the prior counterpart device as discussed in U.S. Pat. No. 4,829,851 (patented on May 16, 1989), the required number of the lobes in the groove is twice as many as an inverse number of a reduction ratio. When the desired reduction ratio is 1/10, the required number of the lobes of a groove provided on one disc is twenty while that provided on other disc eighteen or twenty-two. When the desired reduction ratio is 1/50, the required number of the lobes of the groove provided on one disc is one hundred while that provided on other disc ninety-eight or one hundred two.

The increased number of lobes to ensure a greater reduction ratio, makes it difficult to machine the grooves. At the same time the spherical dimensions of the balls must be reduced which leads to a loss of transmission torque.

On the contrary, according to the embodiment of the invention, the required number of the lobes in the groove is reduced to half the number of the lobes of the prior grooves without reducing spherical dimensions of the balls. This enables a reduction ratio of 1/100 with space equivalent to a reduction ratio of 1/50 in the prior counterpart.

As may be apparent from the description, the structure is such that the first and second discs 4 and 6 are arranged in opposing relationship, allowing the overall thickness to be reduced while permitting a relatively high reduction ratio.

Further, the connection between the discs 4 and 6 reduces play such as backlash between the discs is reduced so as to control the rotational angle of the output shaft 14 with high precision.

In addition, the discs 4 and 6 are positively and directly connected by balls 17. This highly rigid structure increases the meshing rate because the balls 17 are tightly placed at the groove 16 and the recesses 16a.

Furthermore, the thinner discs 4 and 6 need only small inertia force themselves, thus improving controllability thereof.

Still further, the lowered friction of the balls 17 against the discs 4 and 6 produces an effective speed reduction with a minimum loss of torque.

Where the second disc 6 usually carries a high load, each of the balls 17 rolls within the corresponding semi-spherical recess 16a by surface-to-surface contact so as to increase the load carrying ability with minimum loss of transmission torque.

The enhancement of the load carrying ability, permits fabrication of the second disc 6 from a hard iron-based metal, thus reducing cost of material, machining time, without sacrificing precision.

It is, further, possible to machine the semi-spherical recesses 16a rapidly with a simple operation as compared to the prior counterpart in which each of the discs must have a cycloidal-based groove.

The balls 17 remain in place in the semi-spherical recesses 16a, so that no member such as cage and retainer is needed to retain the balls at regular intervals. This reduces the number of parts, assembled and reduces manufacturing cost.

Figure 4:
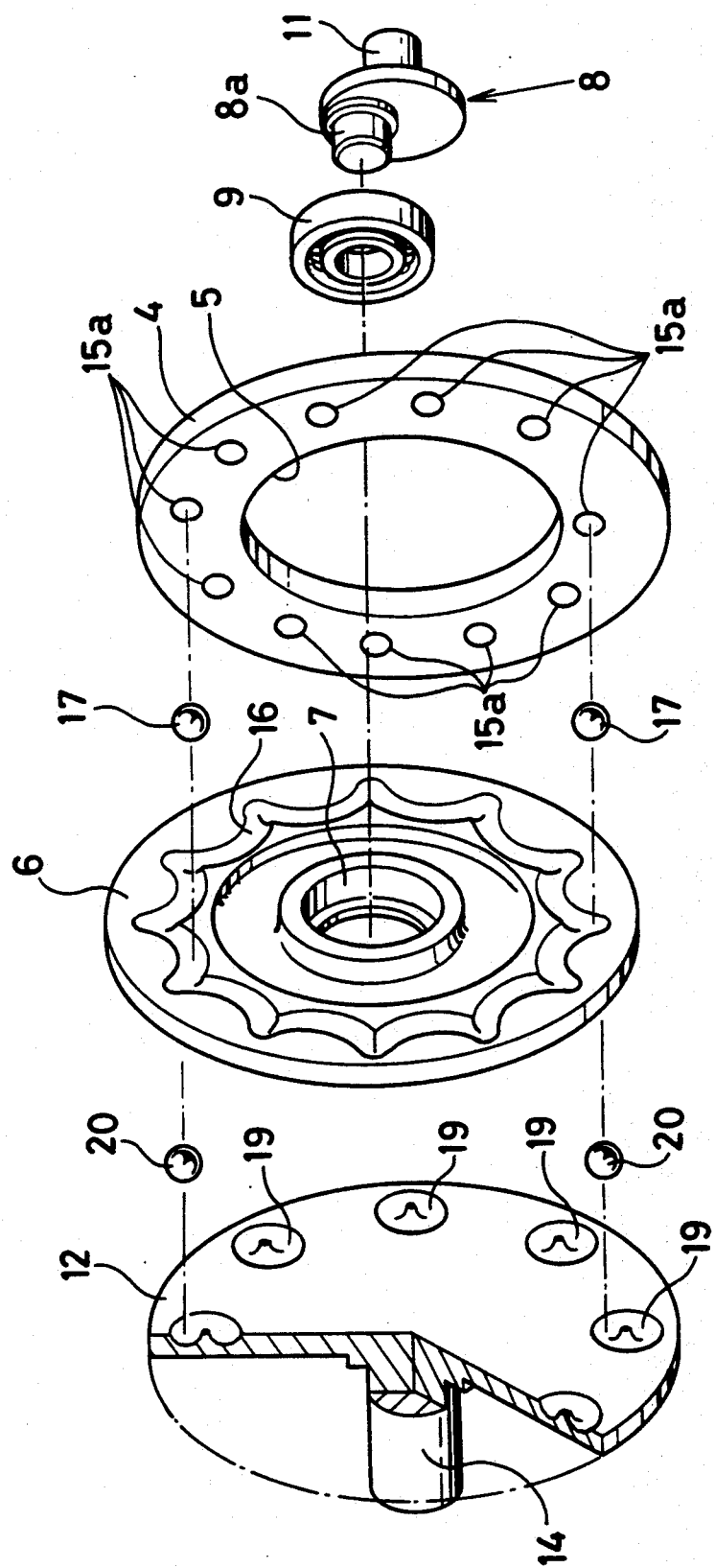
FIG. 4 is a view similar to FIG. 2 according to a second embodiment of the invention.

FIG. 4 shows a second embodiment of the invention in which like reference numerals are identical to those in the first embodiment of the invention.

In this second embodiment, eleven semi-spherical recesses 15a are provided on the surface of the first disc 4 while a hypocycloidal-based groove 16 is provided on the surface of the second disc 6.

In this instance, the reduction ratio is determined by the number of lobes the groove 16, although the relationship between the number of the lobes and that of the balls is the same as a first embodiment of the invention.

When the desired reduction ratio is 1/10, the required number of lobes is ten. A desired reduction ratio of 1/12 twelve lobes to while the desired reduction ratio of 1/15 requires fifteen lobes. The rotational direction of the output is in an inverse relationship with that of the input. In other words, the input shaft 11 rotated in one direction results in the output shaft 14 rotated in another direction.

It is noted that a hypocycloidal-based groove may be provided on the surface of the second disc 6 instead of on the first disc 4.

Figure 5:
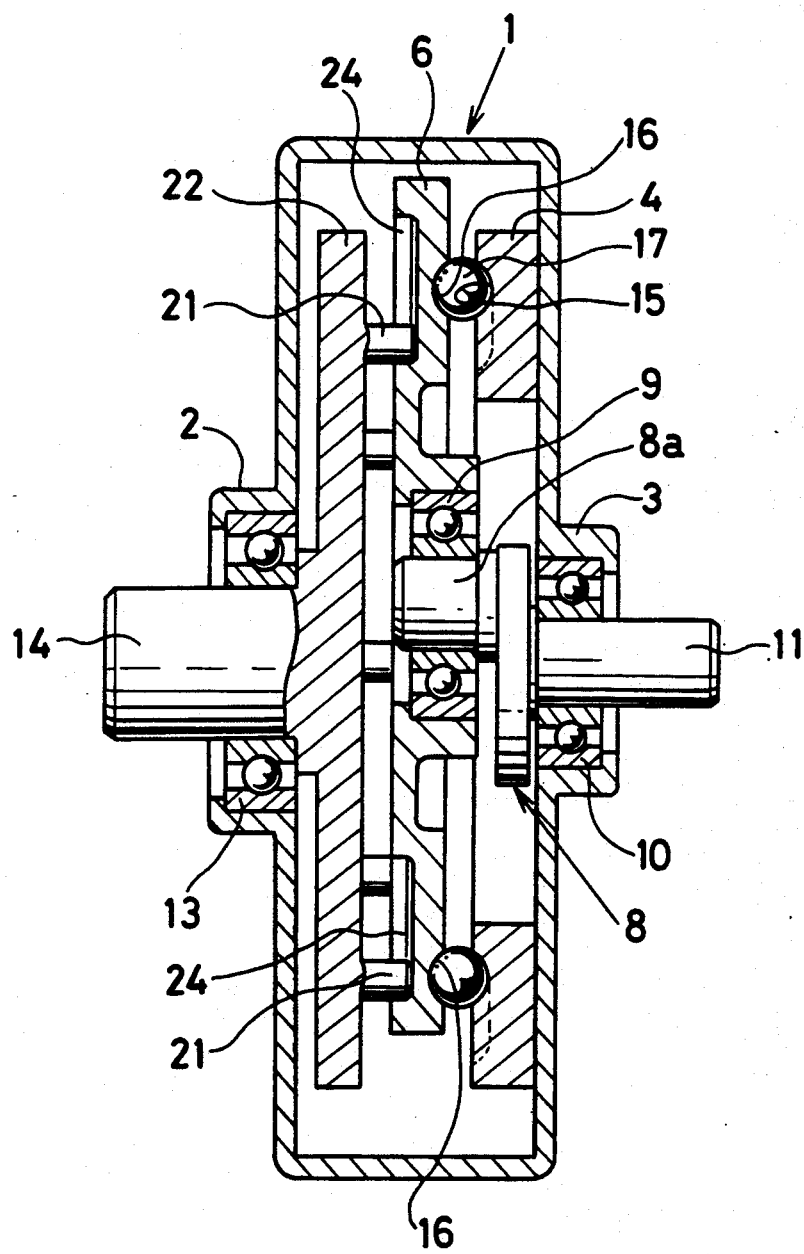
FIG. 5 is a longitudinal cross-sectional view of a speed reducer device according to a third embodiment of the invention.
Figure 6:
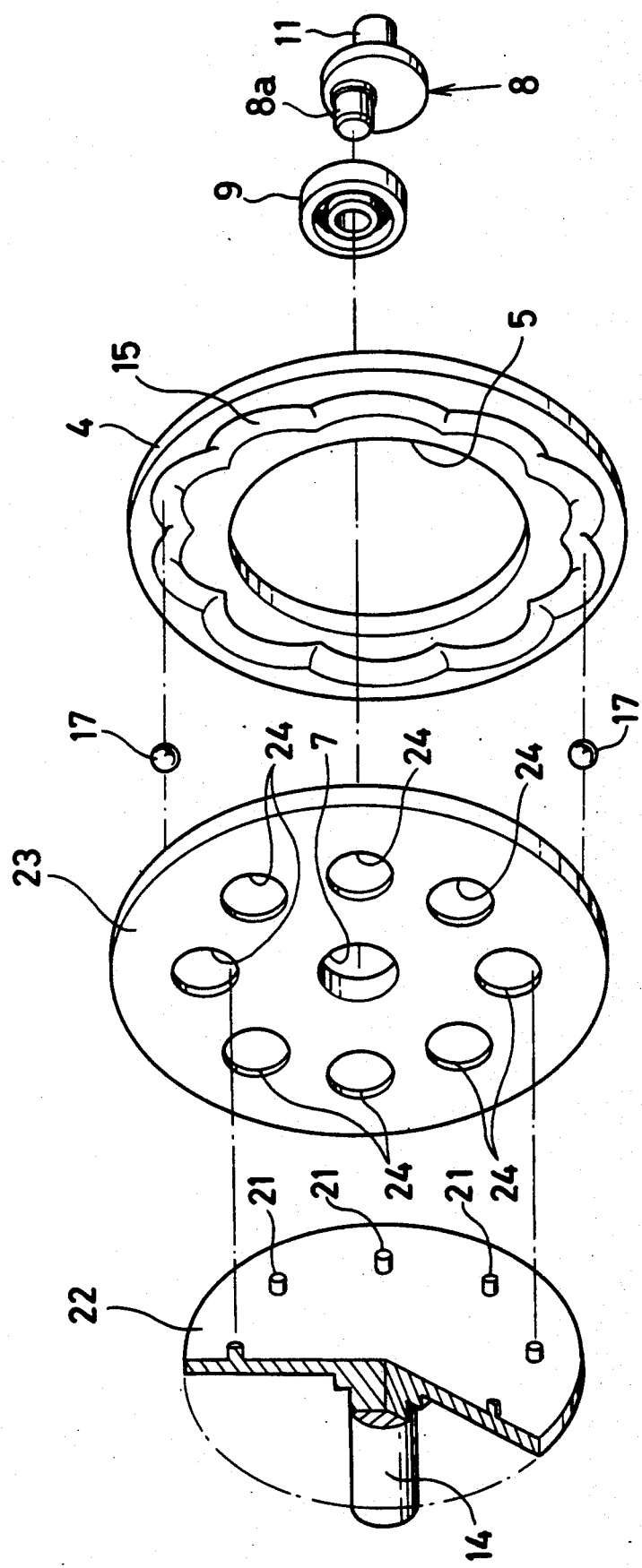
FIG. 6 is a view similar to FIG. 2 according to a third embodiment of the invention.

FIGS. 5, 6 show a third embodiment of the invention wherein like parts are indicated by like reference numerals and in which instead of balls 20, pins 21 are employed on the rectifier disc here shown at 22 in place of the annular grooves 19. The pins 21 are parallel to the output shaft 14. The rectifier disc 23 has circular apertures 24 which the corresponding pin 21 engages to allow each pin to move along the circumferential wall of the corresponding aperture 24 upon movement of the second disc 23. The diameter of the aperture 24 is equivalent to the eccentricity between the groove 15 and the recesses 16a. When a rotational movement is transmitted to the second disc 23, the disc 23 is imparted with a nutational movement so that the circumferential wall of the aperture 24 slides along an outer surface of the pin 21 to transmit only a rotational movement to the rectifier disc 22.

Figure 7:
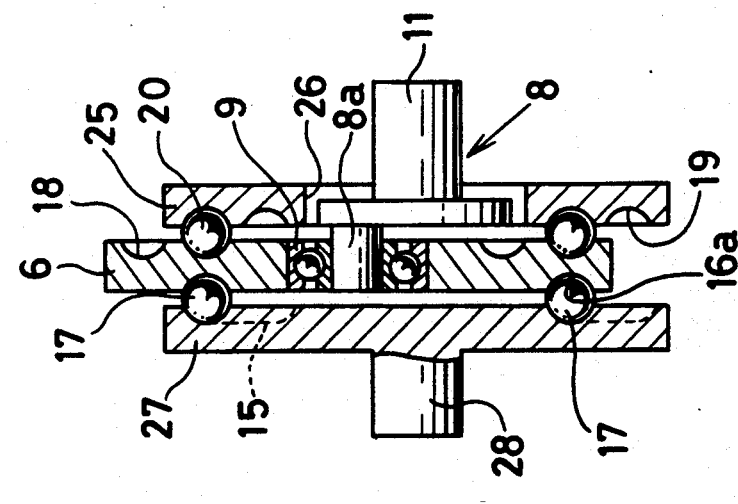
FIG. 7 is a view similar to FIG. 1 according to a fourth embodiment of the invention, with a casing removed.

FIG. 7 shows a fourth embodiment of the invention in which the circular disc 4 and the rectifier disc 12 of the first embodiment of the invention are oppositely placed. A rectifier disc 25 has a central hollow portion 26, while a second disc 27 has a central output shaft 28 in place of the central hollow 5 of the first embodiment.

Figure 8:
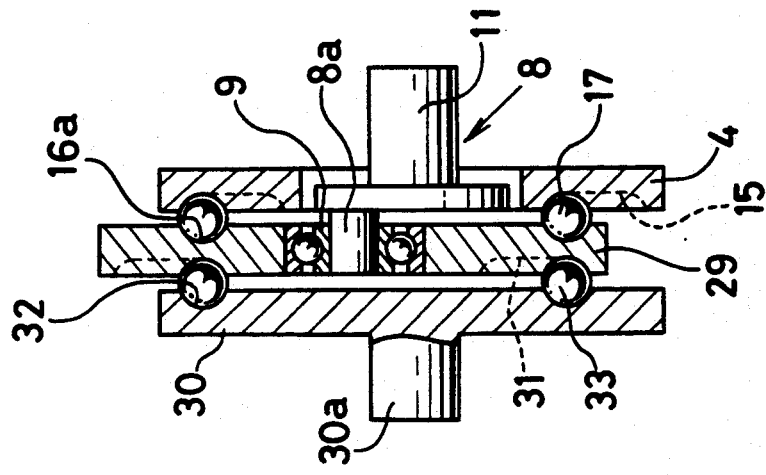
FIG. 8 is a view similar to FIG. 7 according to a fifth embodiment of the invention.

FIG. 8 shows a fifth embodiment of the invention in which discs are arranged in series to establish a composite speed reduction ratio. In this embodiment, a groove 31 and semi-spherical recesses 32 are provided on each surface of a second disc 29 and a rectifier disc 30 respectively instead of the annular grooves 18, 19 of the first embodiment.

Between the discs 29, 30, are rollable balls 33 engaging both the corresponding recess 32 and the groove 31.

The rotational input from the eccentric shaft 8 is reduced by the first and second discs 4, 29. The input, thus reduced, is further reduced by the second disc 29 and the rectifier disc 30 so that a significantly reduced output is produced from an output shaft 30a formed on the rectifier disc 30. Thus, the discs connected in series make it possible to ensure reduction ratios changing from low to high ratios almost continuously.

Figure 9:
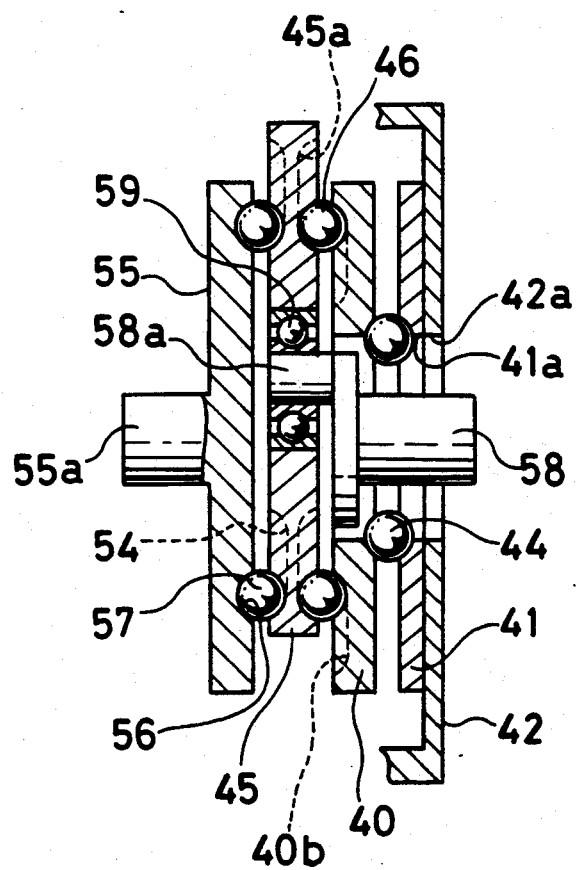
FIG. 9 is a view of similar to FIG. 7 according to a sixth embodiment of the invention.
Figure 10:
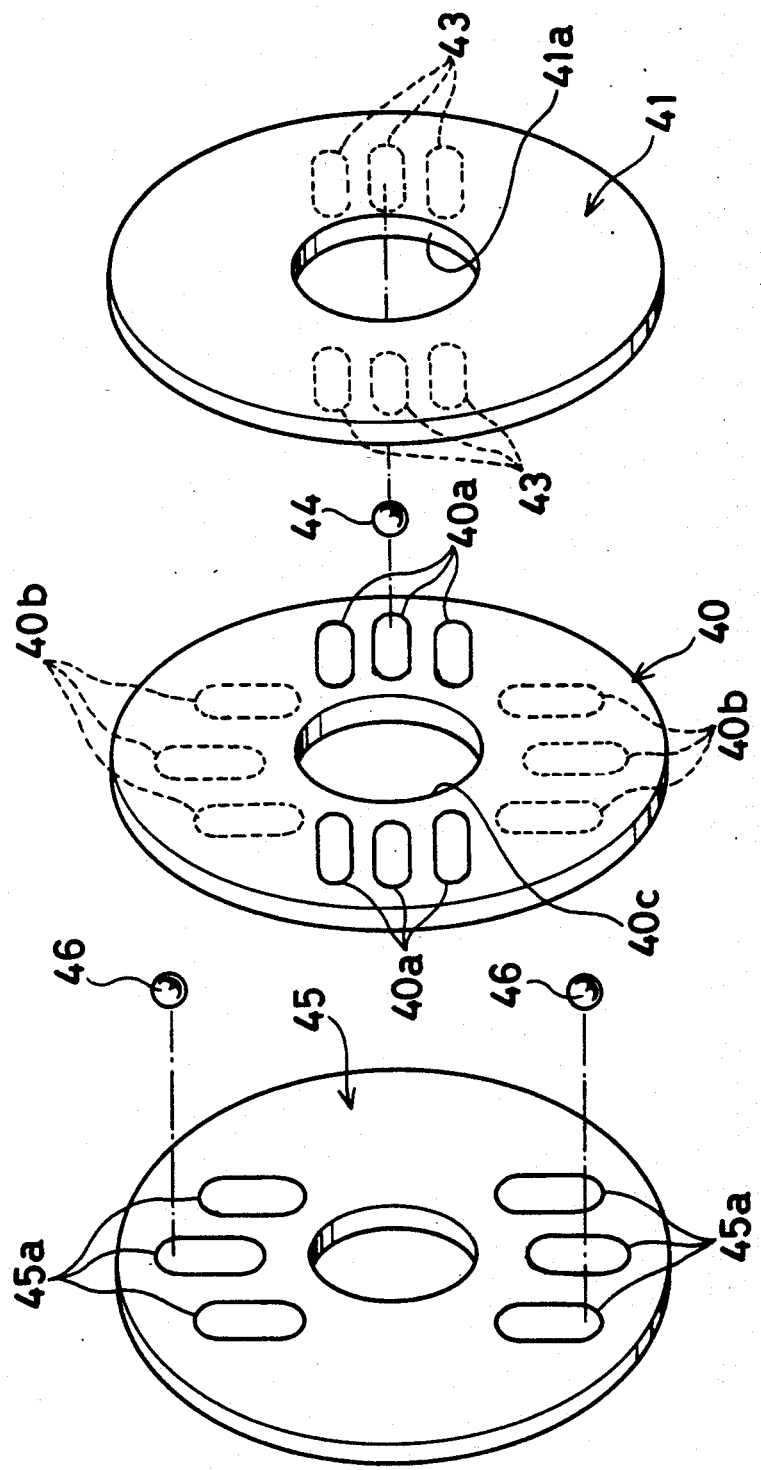
FIG. 10 is an exploded perspective view of a rectifier member according to the sixth embodiment of the invention.

FIGS. 9 and 10 show a sixth embodiment of the invention wherein a rectifier member comprises three annular discs including an oscillatory disc 40. Numeral 41 designates a support disc fixed to a casing 42 which carries a central aperture 42a. On one surface of the support disc 41, are two sets of three slits 43 provided in a diametrically opposed relationship with the aperture 42a interposed. The oscillatory disc 40 faces the support disc 41, and has a central aperture 40c, one surface of which has slits 40a corresponding to slits 43, while the other surface of the disc 41 has two sets of three slits 40b perpendicular to the slits 40a. Each of shuttle balls 44 are positioned in both slits 40a and the slits 43. A first disc 45 is arranged to face the oscillatory disc 40. Slits 45a provided on one surface of the first disc 45 is connected to the slits 40b of the oscillatory disc 40 via shuttle balls 46. On the other surface of the first disc 45, a groove 54 is provided which is connected by rollable balls 57 to semi-spherical recesses 56 formed on a second disc 55. The second disc 55 has an output shaft 55a to serve as an output generating member. Eccentric shaft 58 has an eccentric end 58a passing through the apertures 42a, 41a and 40c is mounted on a central boss of the disc 45 by means of a bearing 59.

In the first and second embodiments, the rollable balls positioned in the semi-spherical recesses may be integrally fixed to the first and second discs by means of welding or brazing. Instead of the rollable balls, semi-spherical projections may be integrally made at the portions which correspond to the recesses when the first disc is machined. In this instance, each of the semi-spherical projections frictionally slides along an inner surface of the groove so that a thrust bearing may be placed on the inner surface of the groove to reduce a friction between the projection and the inner surface of the groove.

A cage or a retainer (not shown) may be used to place rectifier balls 20 in position to facilitate mounting when the balls are placed in the annular grooves 18, 19 as described in the first embodiment.

The annular grooves 18, 19 may be in the form of V-shaped arch in (in cross-section) to make the rectifier balls come into two-point contact with the inner walls of the grooves.

Also, the rollable and rectifier balls may be made from tough and wear-resistant ceramic material with silicon nitride as a main component.

While the invention has been described with reference to specific embodiments, it is understood that this description is not to be construed in a limiting sense in as much as various modifications and additions to the specific embodiments may be made by a skilled artisan without departing from the spirit and scope of the invention.

What is claimed is:

1. A gearless differential speed reducer device comprising:
    first and second discs located to oppose each other through their opposing surfaces;
    a plurality of semi-spherical recesses circumferentially provided on the opposing surface of one of the first and second discs along a certain pitch circle;
    a groove provided on the opposing surface of the other of the first and second disc, the groove defined as a cycloidal-based curve running along a pitch circle, a radius of which is the same as that of the semi-spherical recesses;
    a rollable ball, one semi-spherical portion of which is generally placed at the recess while other semi-spherical portion of the ball placed at the groove, the ball rolling within the recess, and at the same time, rolling along the groove when a rotational movement is transmitted to the second disc to impart the second disc with a nutational movement; and
    a rectifier member provided to pick up a rotational movement from the nutational movement of the second disc.

2. A gearless differential speed reducer device as recited in claim 1, wherein the groove is provided on the opposing surface of the first disc while the semi-spherical recesses are provided on the surface of the second disc.

3. A gearless differential speed reducer device as recited in claim 1, wherein the semi-spherical recesses are provided on the opposing surface of the first disc while the groove is provided on the surface of the second disc.

4. A gearless differential speed reducer device as recited in claim 1, wherein the groove is defined as an orbital path selected from the group consisting of hypocycloidal curve and epicycloidal curve.

5. A gearless differential speed reducer device as recited in claim 1, wherein the rectifier member comprises a rectifier disc located to oppose the other surface of the second disc in the opposite side to the first disc, a plurality of circular cavities circumferentially provided on the surface of the second disc, a plurality of pins provided on the opposing surface of the rectifier disc to correspond to the cavities, the pins adapted to slide along a circumferential wall of the corresponding cavity when a rotational movement is transmitted to the second disc to impart the second disc with a nutational movement.

6. A gearless differential speed reducer device as recited in claim 1, wherein the rectifier member comprises a rectifier disc located to oppose the other surface of the second disc in the opposite side to the first disc, a plurality of circular grooves circumferentially provided on the surface of the second disc, circular grooves provided on the opposing surface of the rectifier disc to correspond to the circular grooves of the second disc, a plurality of balls, each of which is placed at the groove of the rectifier disc and that of the second disc, and so as to roll therealong when a rotational movement is transmitted to the second disc to impart the second disc with a nutational movement.

7. A gearless differential speed reducer device as recited in claim 1, wherein the rollable balls are made of a metallic steel.

8. A gearless differential speed reducer device as recited in claim 1, wherein the rollable balls are made of a friction-resistant ceramic material with silicon nitride as a main component.

9. A gearless differential speed reducer device as recited in claim 1, wherein the first and second discs are made of a metallic material, said metallic material treated to case harden the groove and the semi-spherical recesses so as to impart them with a friction-resistant property.

10. A gearless differential speed reducer device as recited in claim 1, wherein a cross sectional shape of the groove is semi-circular, which has a radius of curvature generally identical to that of the rollable ball.

11. A gearless differential speed reducer device as recited in claim 1, wherein the semi-spherical recess has a radius of curvature which is generally identical to that of the rollable ball.

12. A gearless differential speed reducer device as recited in claim 1, wherein a cross section of the groove is in the form of V-shape along which the rollable ball rolls by two-point contact.

* * * * *